(No Model.)
F. SHERIDAN.
DRAFT EQUALIZER.
No. 396,617. Patented Jan. 22, 1889.
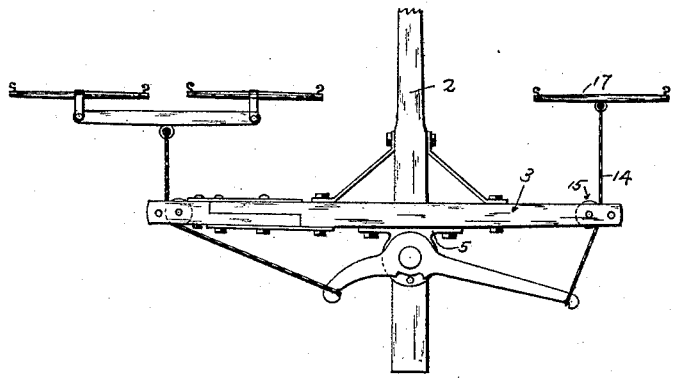
Fig. 1
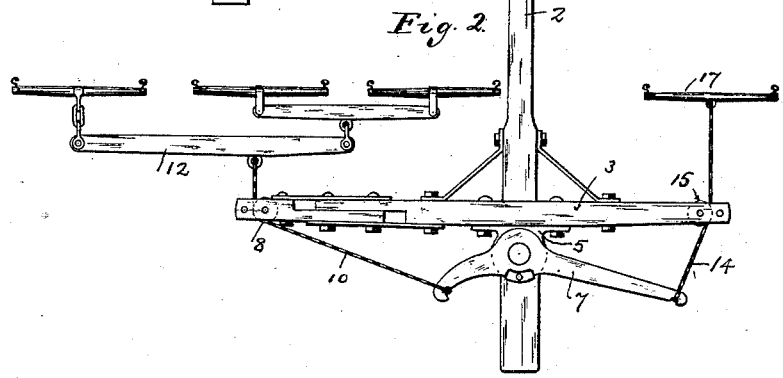
Fig. 2
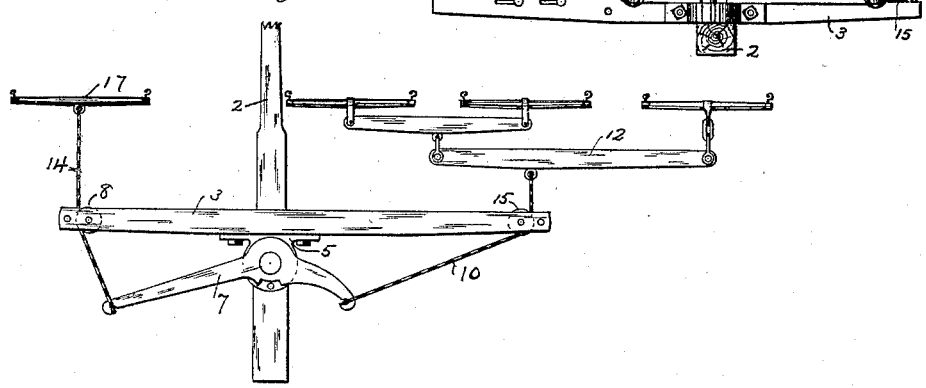
Fig. 3
Fig. 4
Witnesses.
J. Jessen.
C. Nachtrieb.
Inventor
Frank Sheridan
By Paul, Sanford & Merwin Atty's

UNITED STATES PATENT OFFICE.

FRANK SHERIDAN, OF ROCKFORD, MINNESOTA.

DRAFT-EQUALIZER.

SPECIFICATION forming part of Letters Patent No. 396,617, dated January 22, 1889.

Application filed May 23, 1888. Serial No. 274,797. (No model.)

*To all whom it may concern:*

Be it known that I, FRANK SHERIDAN, of Rockford, in the county of Wright and State of Minnesota, have invented certain Improvements in Draft-Equalizers, of which the following is a specification.

My invention relates to improvements in a device for equalizing the draft upon the pole of a plow or harvester and allow the draft of one horse upon one side of the pole to offset the draft of two or more upon the opposite side.

My invention consists, generally, in the construction and arrangement hereinafter described, and particularly pointed out in the claims.

In the drawings which form part of this specification, Figure 1 is a plan view of my improved equalizer attached to the pole. Fig. 2 is a similar view showing it arranged for four horses. Fig. 3 is an elevation. Fig. 4 is a modification showing the manner of reversing the equalizer.

In the drawings, 2 represents the tongue or pole, and 3 the equalizer-bar. This bar is securely fastened to a casting, 5, located upon the tongue and projects an equal distance at each side of the said casting. The long end of this bar extends to the side upon which the heavy draft is exerted.

The casting is preferably provided with a flange or projection at the back of the bar 3, upon which is fulcrumed the lever 7. This lever is preferably in the form shown in Fig. 1, although a bell-crank may be used. In either case the short end of the lever extends in the direction of the long end of the bar 3. A sheave or pulley, 8, is preferably journaled in the end of the bar 3, and a chain or cable, 10, passes over this pulley, and is secured to the evener-bar 12 at one end and to the short end of the lever 7 at the other.

A chain or cable, 14, is passed over a sheave, 15, at the opposite end of the bar 3, and is attached to the long end of the lever 7 and to the whiffletree 17. The difference in the length of the two ends of the lever is sufficient to allow the draft of one horse upon one end of the lever to counterbalance the draft of the extra number of horses upon the other end.

It may be convenient to construct the bar 3 to be used either for two or three horses upon the long end of the bar, and I prefer to make this end of the bar extensible. The bar is made in two pieces, which are halved together, as shown in Figs. 1 and 2, and provided with suitable slots and bolts to hold the two portions in their required position. When two horses are used upon this end of the bar, the outer portion is drawn in, as shown in Fig. 1. When three horses are used, the bar is lengthened to the position shown in Fig. 2.

I may prefer to construct the device so that it may be readily reversed, as the side upon which the single horse is used varies in different farm implements. I accomplish this change by removing the pin and reversing the lever. The bar 3, which is furnished with two sets of bolt-holes at the proper distance apart, may be detached from the casting 5, the retaining-bolts removed from one set of holes and inserted in the other, changing the bar from the position shown in Fig. 2 to the position shown in Fig. 4. The evener and whiffletrees can now be attached in their proper places. I can thus readily make the change and form a right or left hand evener, as desired.

I claim as my invention—

1. In a draft-equalizer, the combination, with the tongue, of the bar 3, adapted to be adjusted laterally upon the tongue, so as to have its longer end upon either side of the said tongue, the reversible lever 7, pivoted upon the tongue at the rear of said bar, and the cables or chains connecting the ends of the lever with the whiffletrees, substantially as described.

2. In a draft-equalizer, the combination, with the tongue, of a casting, 5, secured to said tongue, a lever, 7, pivoted upon said casting and capable of being reversed thereon, and the extensible bar 3, adjustably secured to the said casting and arranged to be extended to the right or left, substantially as described.

In testimony whereof I have hereunto set my hand this 5th day of May, 1888.

FRANK SHERIDAN.

In presence of—
C. A. PIDGEON,
D. CRUIKSHANK.